L. H. SOENS.
DRAFT EQUALIZER.
APPLICATION FILED MAR. 18, 1915.
1,163,379.
Patented Dec. 7, 1915.
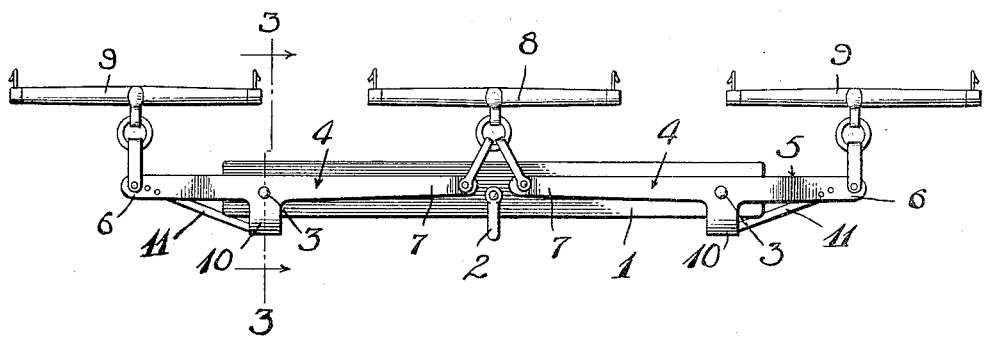
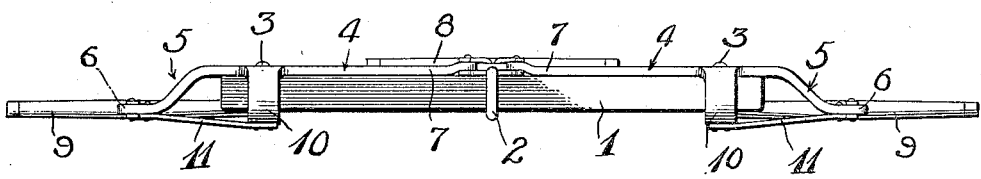
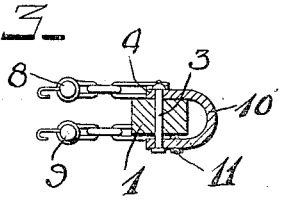
Inventor
L. H. Soens

UNITED STATES PATENT OFFICE.

LOUIS H. SOENS, OF MANCOS, COLORADO.

DRAFT-EQUALIZER.

1,163,379.  Specification of Letters Patent.  Patented Dec. 7, 1915.

Application filed March 18, 1915. Serial No. 15,257.

*To all whom it may concern:*

Be it known that I, LOUIS H. SOENS, a citizen of the United States, residing at Mancos, in the county of Montezuma and State of Colorado, have invented certain new and useful Improvements in Draft-Equalizers; and I do declare the following to be a full, clear, and exact description of the invention, such as will enable others skilled in the art to which it appertains to make and use the same.

My invention relates broadly to improvements in draft equalizers and specifically to the construction of the trees used on such devices.

Heretofore, it has been the common practice to pivotally attach the equalizing trees of a three horse evener to the opposite ends of the double tree and to provide clevises at such points of pivotal connection, these clevises having been heretofore made separately from the trees. This construction has proved very undesirable and in most cases does not perform the necessary bracing function at all efficiently.

It is therefore the main object of my invention to overcome this difficulty, by providing a rigid clevis formed as a part of, or brazed or otherwise secured to, each of the trees.

With this end in view, the invention resides in certain novel features of construction and combination hereinafter described and claimed.

In describing the invention, I shall refer to the accompanying drawing in which like reference characters designate corresponding parts throughout the various views and wherein:

Figure 1 is a top plan view of an evener, the trees of which are constructed in accordance with my invention; Fig. 2 is a rear edge view of the evener; and Fig. 3 is a vertical transverse section as seen along the plane indicated by the line 3—3 of Fig. 1.

In this drawing, constituting a part of the application, a double tree 1 is shown, this tree being preferably, though not necessarily, formed of wood and being equipped with a clevis 2 at its center, whereby it may be attached to a wagon, implement or machine to be drawn. Pivoted to the upper side of the double tree 1 by the provision of upright pivot pins or bolts 3 is a pair of equalizing levers or trees 4, the outer end portions of these trees being bent downwardly and then continued outwardly as seen at 5 to provide comparatively short arms 6, while the inner rectilinear arms 7 thereof, are approximately of twice the length of the arms 6 for a purpose to appear.

Connected by any appropriate means to the inner ends of the arms 7, is a central swingletree 8, while likewise connected to the outer ends of the arms 6 is a pair of swingletrees 9.

By the construction so far described, it will be seen that the central horse which is pulling upon the swingletree 8 will have a tendency to rock the double tree 1 forwardly, or to move its upper side forwardly, whereas the outside horses which are pulling forwardly upon the trees 9, will overcome any such tendency of the double tree 1 to rock forwardly. It will therefore be seen that considerably less strain is placed upon the clevis 2 as well as upon the pivots 3, than that caused by constructing devices of this class in such a manner as to provide equalizing trees whose inner and outer ends lie in the same horizontal plane, it being understood that the tendency of this construction is to tilt the double tree forwardly, thus exercising a great deal of strain upon the clevis at the center thereof, or upon any other pivotal connection which may be provided at this point.

Although I have shown the two trees 4 as connected with additional trees 8 and 9, it will be obvious that by forming them in the proper proportions, they could well be used as swingle trees when only two horses are to be used, in which case the tendency of the double tree to tilt is overcome by the fact that the outer traces are pulling forwardly in planes below the inner traces.

In addition to the features above described, each of the trees 4 is provided on its rear edge with a rigid U-shaped clevis 10 one of whose ends is here shown as formed integrally therewith, while its other end is so positioned and apertured as to receive the lower end of the pivot pin 3. By this provision, the trees 4 are still more effectively braced. It will be understood, however, that the clevises 10 need not be formed integrally with the trees, but that they might be brazed, riveted or otherwise rigidly secured thereto, since such construction would likewise accomplish the desired results.

Furthermore, it will be evident that a tree provided with one of the rigid clevises 10 could well be used as a swingle tree, whether its outer end be deflected downwardly or be disposed in the same plane with its inner end. I do not therefore wish to be limited to the specific association of parts shown in the drawing.

Although, in some cases, it may not be absolutely necessary, a pair of brace rods 11 is preferably provided, the outer ends of said rods being secured to the outer ends of the levers 4, while the inner ends thereof are rigidly fastened to the clevises 10, as clearly disclosed in Figs. 1 and 2.

From the foregoing description, taken in connection with the accompanying drawing, it will be seen that although the changes made over the ordinary types of draft equalizers are apparently small, the efficiency thereof is greatly increased.

I claim:—

In a device of the class described comprising an equalizing tree formed from a single piece of metal and having a pivot hole nearer one end than the other to provide a long and a short arm, said hole being adapted to receive a pivot pin carried by a main tree, said short arm being extended beyond the end of the main tree, bent downwardly and then continued outwardly, the outwardly continuing portion being disposed in a plane below the center of the main tree, and said long arm having its end upwardly offset, said tree having integrally formed on its rear edge opposite said pivot hole, a downwardly and forwardly bent tongue to provide a substantially U-shaped clevis adapted to embrace the main tree, the free end of said clevis having a pivot hole alined with the first mentioned hole for the reception of the pivot pin, a brace rod secured by its outer end to the outer end of the equalizing tree, and by its opposite end to the clevis, and means on the outer ends of said tree for the attachment of swingle trees.

In testimony whereof I have hereunto set my hand in presence of two subscribing witnesses.

LOUIS H. SOENS.

Witnesses:
W. B. WILSON,
W. E. FARIS.

Copies of this patent may be obtained for five cents each, by addressing the "Commissioner of Patents. Washington, D. C."